United States Patent [19]
Smith

[11] Patent Number: 5,092,231
[45] Date of Patent: Mar. 3, 1992

[54] NUT CRACKER

[76] Inventor: Raleigh M. Smith, 813 Hwy. 1, North, Greenville, Miss. 38701

[21] Appl. No.: 745,844

[22] Filed: Aug. 16, 1991

[51] Int. Cl.⁵ .............................................. A23N 5/00
[52] U.S. Cl. ..................................... 99/572; 30/120.2; 99/577; 99/579
[58] Field of Search ................ 30/120.2, 120.3, 120.4, 30/120.5; 99/572, 573, 577, 579, 581; D7/680; 81/126, 129, 154

[56] References Cited

U.S. PATENT DOCUMENTS

| | | | |
|---|---|---|---|
| 1,192,846 | 8/1916 | Boyer | 30/120.5 |
| 1,461,875 | 7/1923 | Hackeney | 81/154 |
| 3,578,047 | 5/1971 | Diggs | 99/572 |
| 4,255,855 | 3/1981 | Brazil | 30/120.5 |
| 4,438,687 | 3/1984 | McNiel | 99/580 |
| 4,466,343 | 8/1984 | Thompson | 99/572 |
| 4,598,475 | 7/1986 | Adams | 30/120.5 |
| 4,665,814 | 5/1987 | Harborne et al. | 99/572 |
| 4,787,307 | 11/1988 | Rollband | 99/579 |
| 4,838,155 | 6/1989 | Steffel | 99/572 |

Primary Examiner—Frank T. Yost
Assistant Examiner—Hwei-Siu Payer
Attorney, Agent, or Firm—Fleit, Jacobson, Cohn, Price, Holman & Stern

[57] ABSTRACT

A nut cracker is designed to accommodate virtually any size nut and provide the same degree of cracking stroke with the same mechanical advantage irrespective of nut size, with only a simple thumb-screw adjustment of a cam.

8 Claims, 3 Drawing Sheets

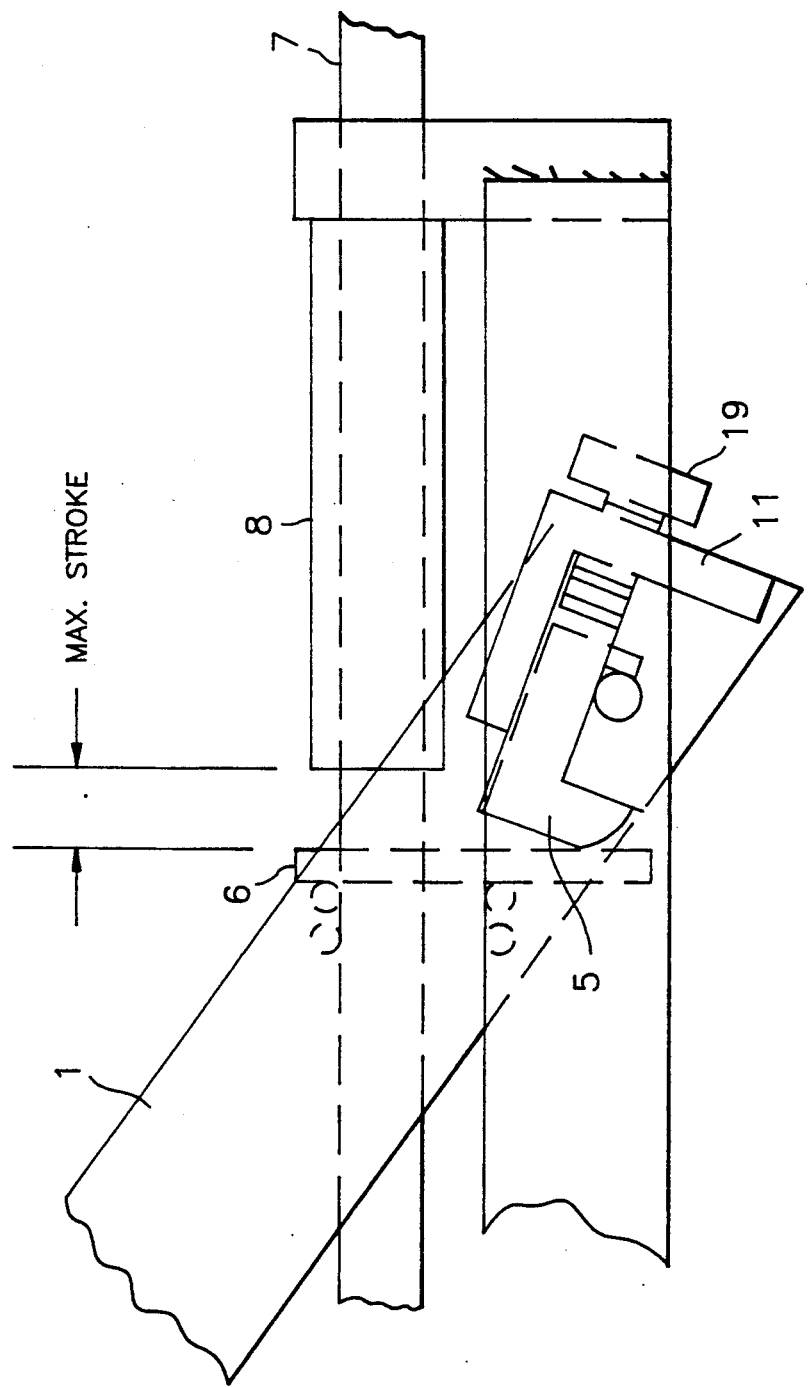

5,092,231

NUT CRACKER

FIELD OF THE INVENTION

A mobile mechanical nutcracker is adjustable to crack nuts the same amount irrespective of nut size.

BACKGROUND

A number of nut crackers are designed to adjust to nut size. In this connection, reference is made to the following U.S. Pat. No(s). 2,740,439; 3,578,047; U.S. Pat. Des. No. 263,106;U.S. Pat. No(s). 4,370,922; 4,438,687; 4,466,343; 4,465,814; and 4,787,307. Some of the noted patents also show other individual features of the present invention.

SUMMARY OF THE INVENTION

An object of this invention is to provide a nut cracker that can be operated on the top of a table without being clamped down. Another object is to provide such a nut cracker which doesn't scratch furniture on which it is operated. A further object is to have a nut cracker which is mobile and can be operated on virtually any surface. A still further object is to have a nut cracker which is small enough to be stored in the kitchen and will crack virtually any common nut. A still further object of the invention is to provide a nut cracker that will crack any nut the same amount regardless of variations in nut size. A further object is to crack any nut with one cycle of a lever. Another object is to provide a nut cracker which has maximum mechanical advantage for every type of nut. A still further object is to have a nut cracker in which the only required adjustment is effected by a simple thumb screw. An additional object is to provide a nut cracker wherein a nut-cracking ram moves a fixed set distance after it has contacted the nut, thus giving the same amount of squeeze regardless of nut size. Still further objects are apparent from the description which follows.

BRIEF DESCRIPTION OF DRAWINGS

FIG. 4 is a breakaway plan view (corresponding to that of FIG. 3) when the cam is set for a smaller-size nut.

DETAILS

Figure 1:
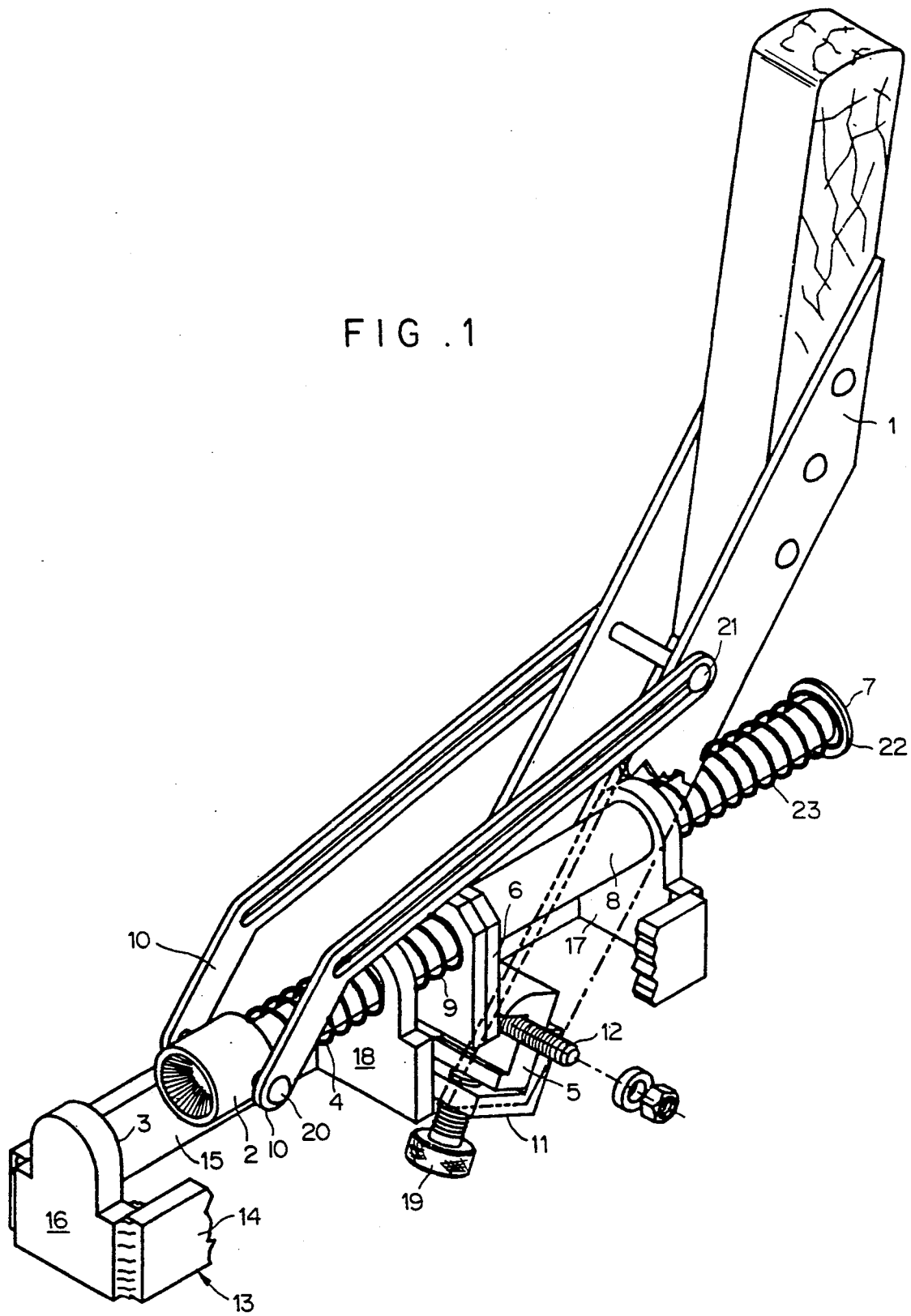
FIG. 1 is an isometric view of the nut cracker with some of the structure broken away to show detail.
Figure 2:
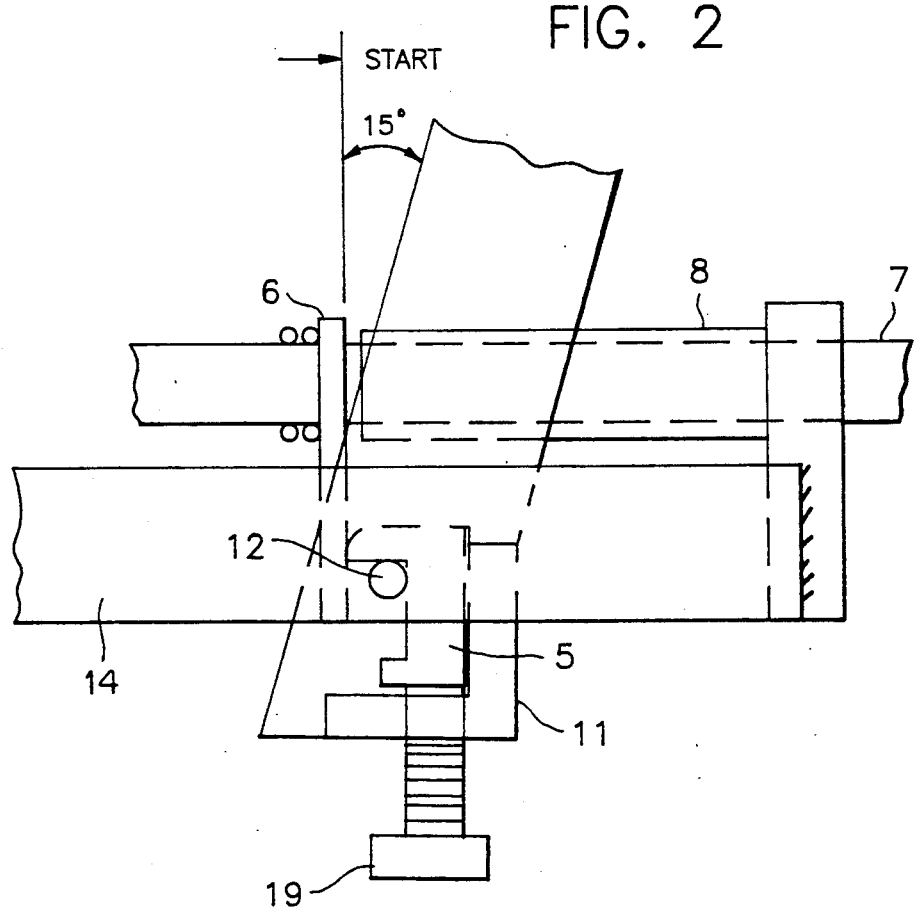
FIGS. 2 and 3 are partial breakaway plan views illustrating the cam operation when the handle is in different positions.
Figure 3:
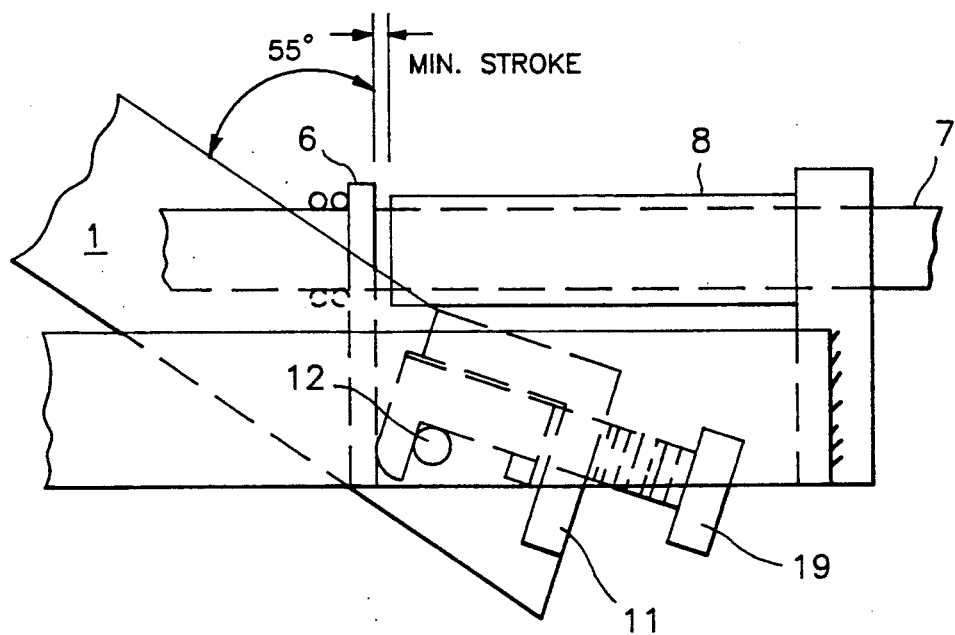

To facilitate removing the fruit from the hull of a nut, the distance that a ram travels after it touches a nut is very critical. Only a few thousandths of an inch makes a big difference. With the setting of a proper stroke for a particular run of nuts, the maximum percentage of kernels will separate from the hulls. The present nut cracker has a variable cam, controlled by a simple thumb screw, which makes it possible to vary the length of the cracking stroke to accommodate virtually any size nut. The nut cracker is infinitely adjustable between a minimum and maximum stroke, as shown in FIGS. 2 through 4.

To operate the nut cracker, it is only necessary to push the handle 1 far enough back to insert a nut between ram 2 and jaw 3. When the handle is brought forward to a position at approximately 15° less than vertical, spring 4 forces ram 2 against the nut. At about this point in the forward movement of the handle, cam 5 engages latch 6, which is locked to shaft 7. Bringing the handle all the way forward completes the stroke required for cracking a nut secured between ram 2 and jaw 3.

When the handle is moved back, cam 5 backs away from latch 6, allowing it to be squared against stop 8 by the action of spring 9. In this position, shaft 7 is free to be withdrawn by link 10 to release a cracked nut which is then allowed to fall into a tray (not shown) below.

Cam 5 is designed to be continually in contact with cam guide 11. When the handle is about 15° before vertical, cam 5 is positioned by cam guide 11 to be approximately vertical, and the total crushing stroke is about 70°. Accordingly, handle 1 passes through a crushing stroke of about 70°, irrespective of the size of nut for which the cam is set. At the beginning of each stroke, latch 6 is always at the same place; it is held against stop 8 by spring 9. Pivot pin 12 is stationary and is held in place by base 13. Base 13 actually provides support for the entire structure and includes side walls 14, 15, end walls 16, 17, and supplemental shaft support 18. End wall 17 serves as the primary shaft support. Jaw 3 is actually the rear side or on the rear side of end wall 16.

Cam guide 11 positions cam 5 vertically when handle 17 is drawn forward to approximately 15° before vertical. Cam 5 is vertically adjustable by screw 19. Cam 5 has a forward nose designed to be substantially parallel to latch 6 at the beginning of each handle stroke, which starts at the same handle position (approximately 15° before vertical). Links 10 are pivotally connected to ram 2 by pivot pin 20 and to handle 1 by pivot pin 21. There is a spring retainer 22 at the remote end of shaft 7 to support spring 23, which biases shaft 7 away from jaw 3 when handle 1 is placed in its back position.

Both the handle and the cam are operable through approximately 70°. The maximum mechanical advantage thus exists for each stroke length. When the cam 5 is set at its lowest position, the crushing stroke approximates 0.062 inch (0.16 cm.). This is illustrated in FIGS. 2 and 3. As the cam is adjusted vertically, the stroke is 0.062 inch plus the additional distance the cam is raised above pivot pin 12. See FIG. 4. The maximum position to which the cam can be adjusted is designed to accommodate all sizes of nuts contemplated. The preferred maximum design travel is about 0.375 inch (0.95 cm.).

The nut cracker is mobile and can be operated on virtually any surface. It will not scratch any surface. It is small enough to be stored in the kitchen; it will crack any nut in any common assortment. It can be set to crack any run of nuts the same amount, regardless of variation in size or type of nut. Cracked nuts fall (of their own weight) through the cracker into a box (not shown) provided for that purpose. The nut cracker is optionally mounted on top of a box into which cracked nuts fall by gravity. The cracker is optionally equipped with a shield that works with the handle to prevent hulls from scattering. Such a shield is not required for the working of the nut cracker. Each nut is adequately cracked with one cycle of the handle (lever). The nut cracker is designed to give the maximum mechanical advantage possible for every type of nut or run of the same species.

The nut cracker is designed to have the ram (that cracks the nut) move a fixed distance (determined by adjustment of a thumb screw) only after it has contacted the nut. All nuts are thus given the same amount of squeeze regardless of nut size.

The invention and its advantages are readily understood from the preceding description. Various changes may be made in the form, construction, and arrangement of parts without departing from the spirit and scope of the invention or sacrificing its material advantages. The previously-described and illustrated form is merely that of a preferred embodiment.

What is claimed is:

1. A nut cracker which comprises:
   a) jaw means,
   b) ram means for crushing or breaking a shell of a nut pushed by the ram means toward the jaw means;
   c) shaft means directly connected to and extending from the ram means in a direction away from the jaw means,
   d) a base integrally connected to the jaw means,
   e) shaft support means integrally connected to the base,
   f) handle pivot means supported by the base,
   g) handle means pivotally connected to the handle pivot means and capable of being moved from an open back position to a closed forward position,
   h) movable latch means direct connected to the shaft means,
   i) stop means, at one side of said latch means, to limit the movement of the latch means away from the jaw means,
   j) adjustable cam means positioned against the handle pivot means and structured to push the latch means toward the jaw means when the handle means is pivoted forwardly toward the jaw means, and
   k) cam adjusting means positioned against said adjustable cam means to vary the distance between the jaw means and the ram means when the handle means is in the closed forward position.

2. A nut cracker of claim 1 further comprises biasing means on said shaft means for biasing said shaft means away from said jaw means with respect to said shaft support means when said handle means is in open back position.

3. A nut cracker of claim 1 further comprising linking r means to pull the ram means away from the jaw means when the handle means is moved toward the open back position, the linking means pivotally connecting the ram means to the handle means.

4. A nut cracker of claim 3 wherein the stop means surrounds part of the shaft means.

5. A nut cracker of claim 3 having cam guide means secured to the handle means and maintaining the cam means against the handle pivot means.

6. A nut cracker of claim 3 wherein the latch means are biased against the stop means by biasing means disposed on said shaft means when the handle means is in the open back position.

7. A nut cracker of claim 3 wherein the stop means is immediately adjacent the shaft support means and extends toward the latch means.

8. A nut cracker of claim 3 which comprises means to bias the ram means toward the jaw means when the handle means is brought forward toward a vertical position.

* * * * *